(12) United States Patent
Wright et al.

(10) Patent No.: US 11,330,879 B2
(45) Date of Patent: *May 17, 2022

(54) SLEEVE FOR ELECTRONIC DEVICE

(71) Applicant: CATALYST LIFESTYLE LIMITED, Hong Kong (HK)

(72) Inventors: Joshua Wright, Hong Kong (HK); June Lai, Hong Kong (HK)

(73) Assignee: CATALYST LIFESTYLE LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,101

(22) Filed: Dec. 4, 2020

(65) Prior Publication Data

US 2021/0085048 A1 Mar. 25, 2021

Related U.S. Application Data

(63) Continuation of application No. 16/458,476, filed on Jul. 1, 2019, now Pat. No. 10,863,807.

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01)

(58) Field of Classification Search
CPC ......... A45C 11/00; F16J 15/02; H04B 1/3888
USPC ................................................ 206/320, 701
See application file for complete search history.

(56) References Cited

U.S. PATENT DOCUMENTS

| | | | | |
|---|---|---|---|---|
| 5,249,814 | A | * 10/1993 | Hailing | F16J 15/0887 277/654 |
| 5,482,299 | A | * 1/1996 | Saito | H01R 13/5205 277/604 |
| D393,148 | S | 4/1998 | Petruzzi | |
| D399,604 | S | 10/1998 | Wolff | |

(Continued)

FOREIGN PATENT DOCUMENTS

| | | |
|---|---|---|
| CN | 304342633 S | 11/2017 |
| CN | 206744792 U | 12/2017 |

(Continued)

OTHER PUBLICATIONS

This glow-in-the-dark,waterproof AirPods case—Catalist AirPods Case, publication date Apr. 14, 2017, [online][site visited Sep. 9, 2019] URL:https://www.theverge.com/circuitbreaker/2017/4/14/15306100/catalyst-case-airpods-sale-glow-in-the-dark (Year: 2017).

(Continued)

*Primary Examiner* — Bryon P Gehman
(74) *Attorney, Agent, or Firm* — Dinsmore & Shohl LLP

(57) ABSTRACT

A water proof sleeve for an electronic device includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs.

19 Claims, 5 Drawing Sheets

(56) References Cited

U.S. PATENT DOCUMENTS

| | | | | |
|---|---|---|---|---|
| 6,068,119 | A * | 5/2000 | Derr | G01D 11/24 206/305 |
| D467,799 | S | 12/2002 | Persson | |
| 6,659,274 | B2 * | 12/2003 | Enners | G06F 1/1626 206/305 |
| 7,347,325 | B2 * | 3/2008 | O'Neill | A45C 1/06 206/38 |
| D592,400 | S | 5/2009 | Nelson | |
| D594,659 | S | 6/2009 | Lown et al. | |
| D620,259 | S | 6/2010 | Fahrendorff et al. | |
| 7,775,354 | B2 * | 8/2010 | Latchford | A45F 5/02 206/320 |
| D666,824 | S | 9/2012 | Phillips et al. | |
| D670,497 | S | 11/2012 | Phillips et al. | |
| D672,642 | S | 12/2012 | Supranowicz | |
| 8,399,764 | B2 * | 3/2013 | Klosky | H04B 1/3888 174/50 |
| 8,644,011 | B2 * | 2/2014 | Parkinson | G06F 1/1626 361/679.09 |
| 9,090,385 | B2 * | 7/2015 | Blagojevic | B65D 43/0214 |
| D794,617 | S | 8/2017 | Wright et al. | |
| D794,618 | S | 8/2017 | Wright et al. | |
| 9,733,054 | B2 * | 8/2017 | Blagojevic | B65D 43/0216 |
| D806,388 | S | 1/2018 | Akana et al. | |
| D808,791 | S | 1/2018 | Johnston et al. | |
| D818,268 | S | 5/2018 | Akana et al. | |
| D846,264 | S | 4/2019 | Wu | |
| D849,401 | S | 5/2019 | Akana et al. | |
| D872,094 | S | 1/2020 | Wright et al. | |
| D872,723 | S | 1/2020 | Lee et al. | |
| D872,724 | S | 1/2020 | Lee et al. | |
| D881,181 | S | 4/2020 | Wright et al. | |
| D886,453 | S | 6/2020 | Wright et al. | |
| 2007/0261978 | A1 * | 11/2007 | Sanderson | A45C 11/22 206/320 |
| 2011/0017620 | A1 * | 1/2011 | Latchford | A45C 13/008 206/320 |
| 2015/0014367 | A1 * | 1/2015 | VanSyckel | B65D 47/121 222/399 |

FOREIGN PATENT DOCUMENTS

| | | |
|---|---|---|
| CN | 208581338 U | 3/2019 |
| CN | 208939608 U | 6/2019 |
| DE | 202018105634 U1 | 11/2018 |
| DE | 202018105634 U1 | 12/2018 |
| KR | 20130028536 A | 3/2013 |
| KR | 200488427 Y1 | 1/2019 |
| KR | 200488427 Y1 | 1/2019 |

OTHER PUBLICATIONS

Kim1991tae. "AirPod Case Catalyst." Naver, Aug. 9, 2017. Web. https://blog.naver.com/kim1991tae/221070237784.

* cited by examiner

SLEEVE FOR ELECTRONIC DEVICE

CROSS-REFERENCE TO RELATED APPLICATION

This application is a continuation application claiming priority under 35 U.S.C. § 120 to U.S. patent application Ser. No. 16/458,476, entitled "SLEEVE FOR ELECTRONIC DEVICE" and filed on Jul. 1, 2019, the entire disclosure of which is hereby incorporated by reference herein.

FIELD OF THE INVENTION

The instant application is directed to a sleeve for an electronic device.

BACKGROUND OF THE INVENTION

Waterproof housings for various devices are known in the art. However such water proof housings are not specifically designed for water proof sealing and folding to allow access to the electronic device. There is therefore a need in the art for a water tight sleeve that has an improved sealing and allows a user to fold the case to access device while positioned within the sleeve.

SUMMARY OF THE INVENTION

In one aspect, there is disclosed a water proof sleeve for an electronic device that includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs.

In another aspect, there is disclosed a water proof sleeve for an electronic device that includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs. The water sealing rib includes a compound curve.

In another aspect, there is disclosed a water proof sleeve for an electronic device that includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs. The water sealing rib includes a compound curve that seals to a curved surface of the electronic device.

Additional features and advantages of the water proof sleeve described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein and together with the description serve to explain the principles and operations of the claimed subject matter.

DETAILED DESCRIPTION OF THE EMBODIMENTS

Figure 1:
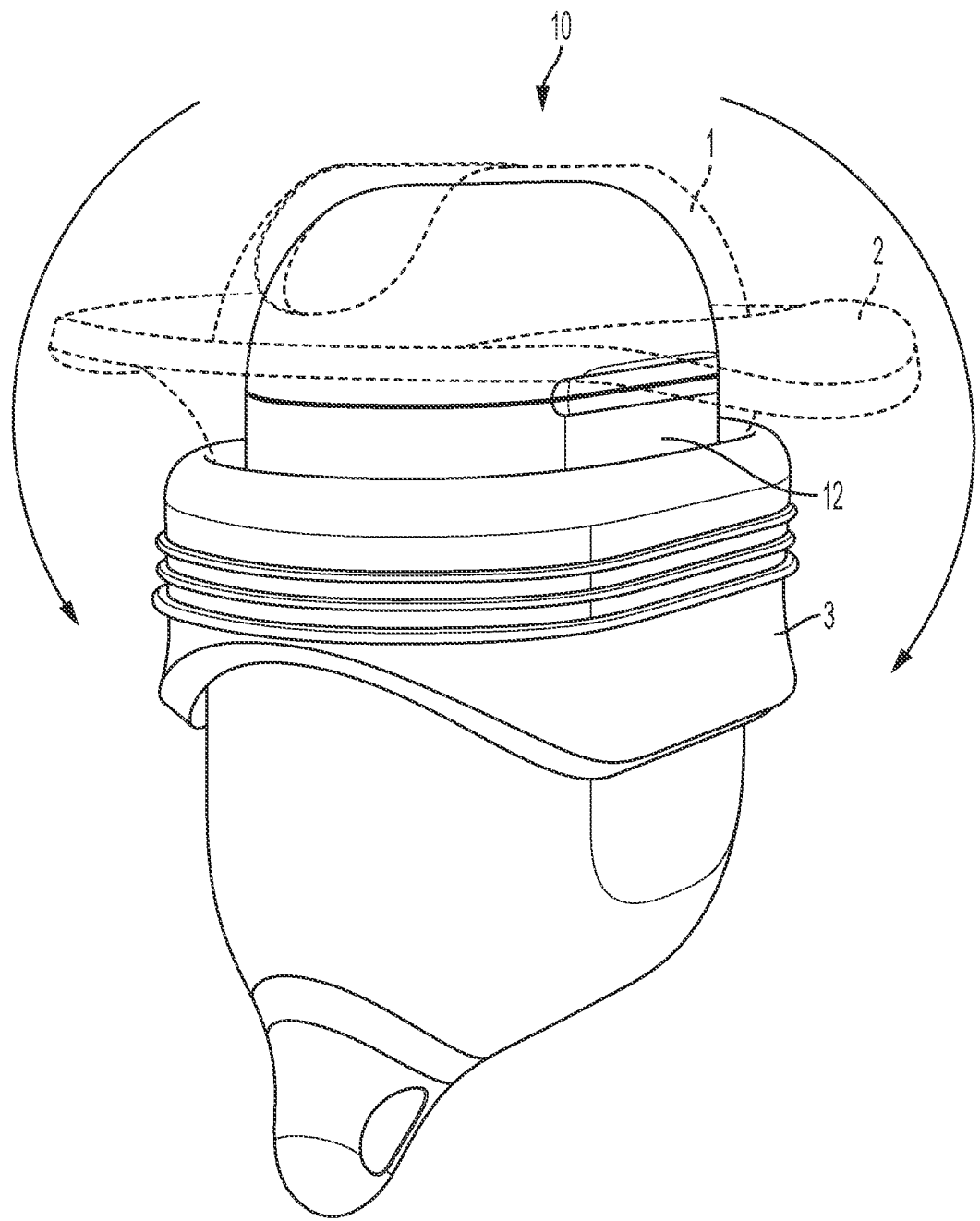
FIG. 1 is a perspective view detailing positions of the Sleeve for Electronic Device.
Figure 2:
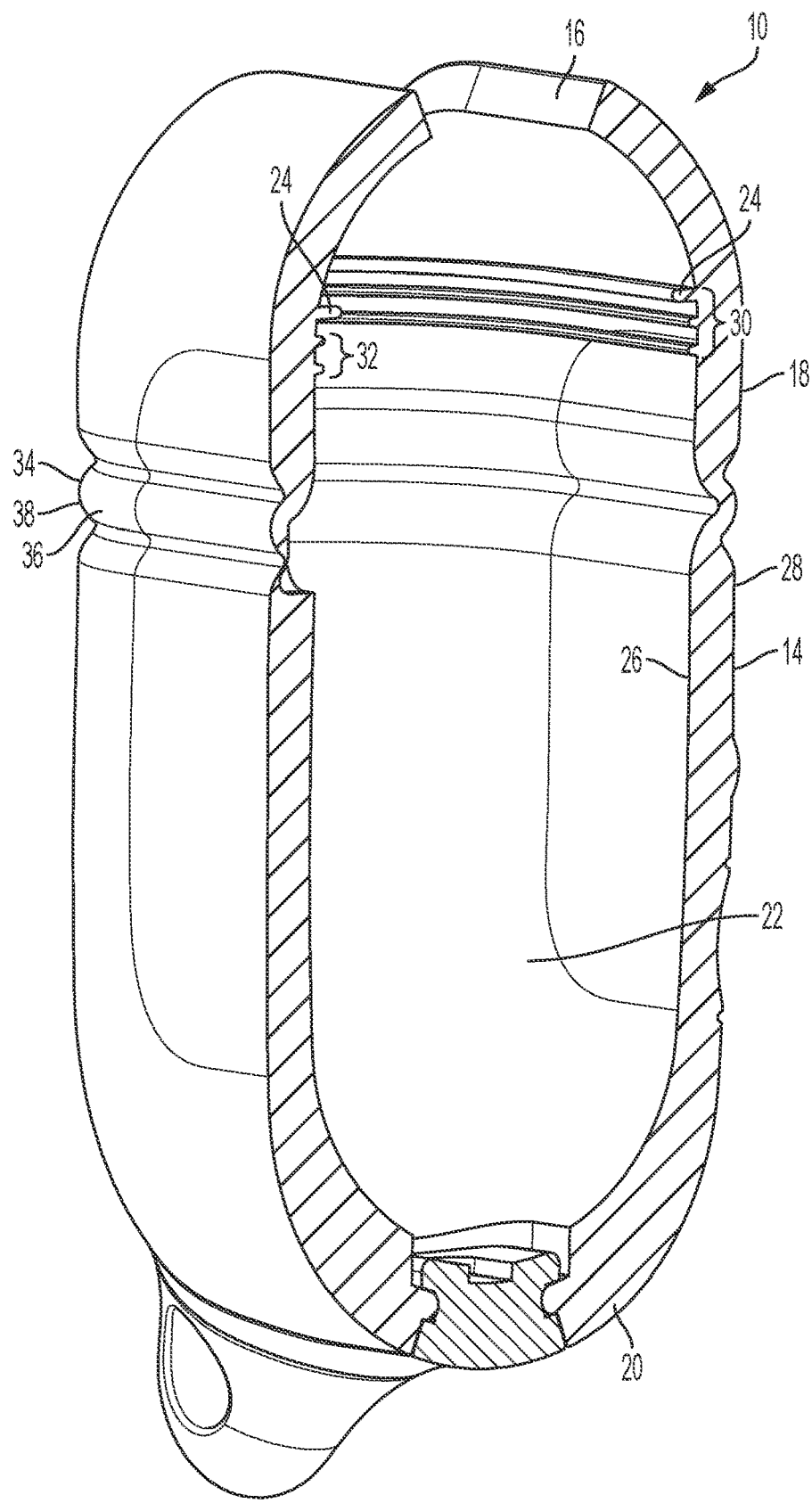
FIG. 2 is a partial perspective sectional view of the Sleeve for Electronic Device.
Figure 3:
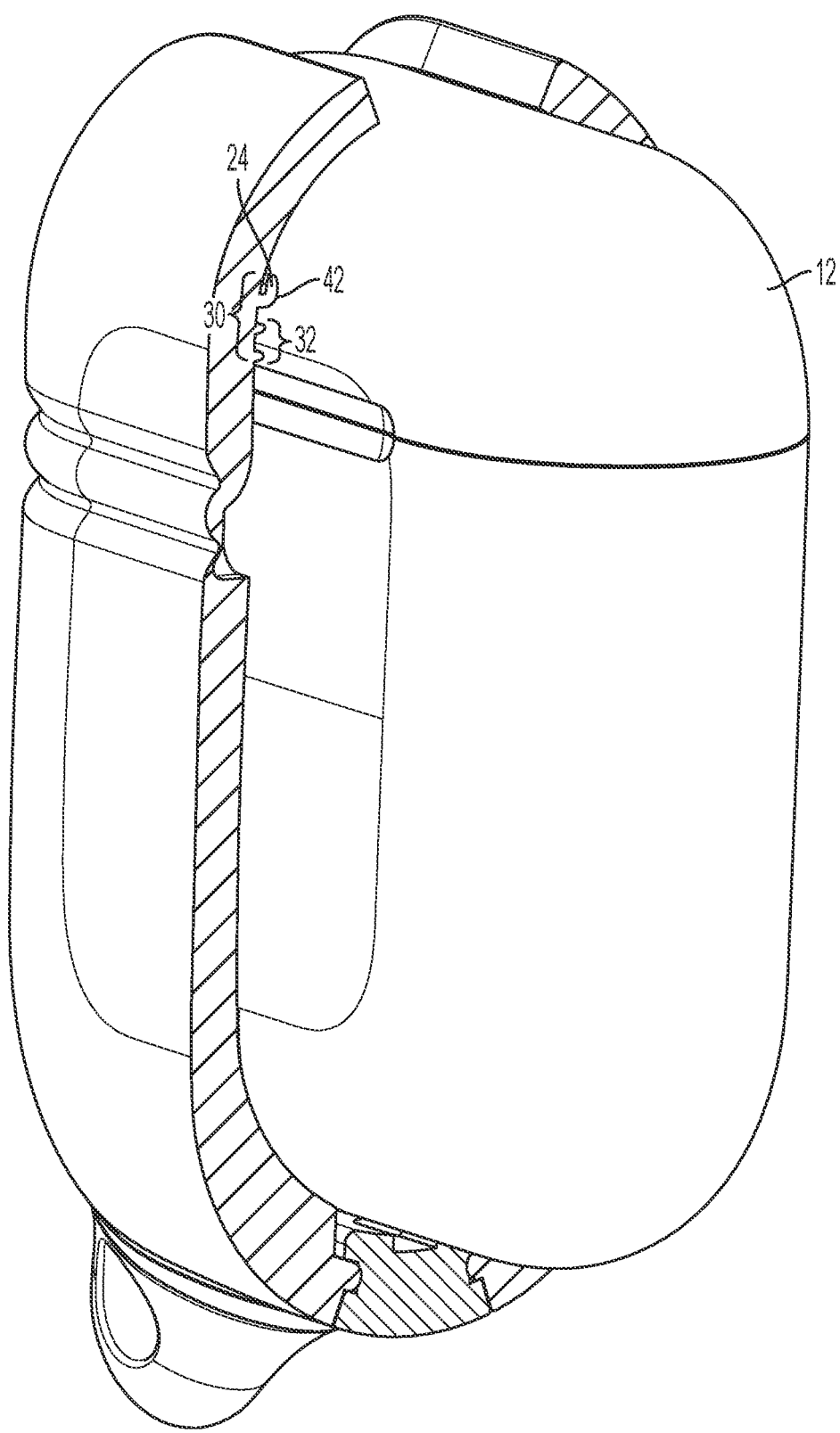
FIG. 3 is a partial perspective sectional view of the Sleeve and Electronic Device.
Figure 4:
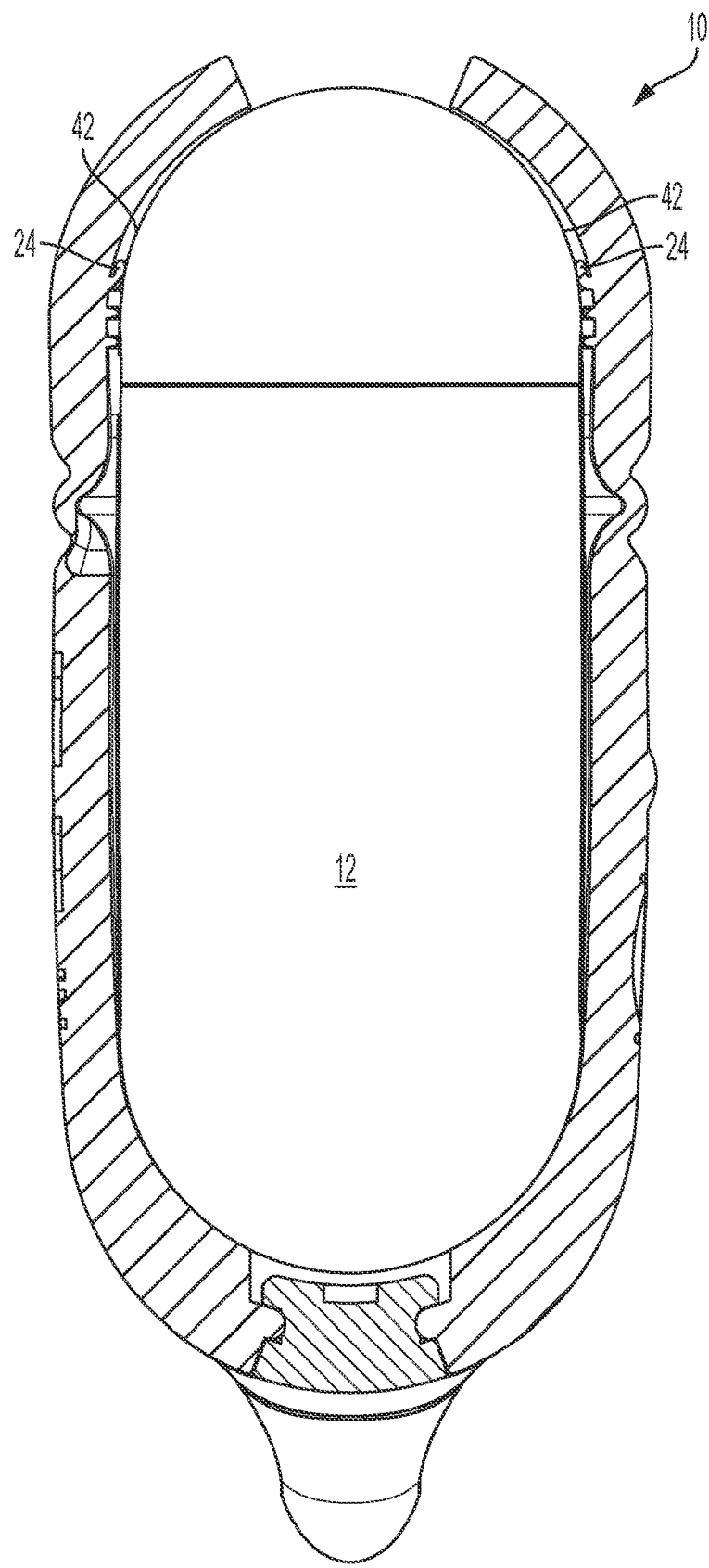
FIG. 4 is a side sectional view of the Sleeve and Electronic Device.

Referring to FIGS. 1-5, there is shown a water proof sleeve 10 for an electronic device 12. The water proof sleeve 10 includes an elastic body 14 including an open top 16 and a curved side wall 18 joined to a bottom wall 20. The curved side wall 18 and bottom wall 20 define an internal cavity 22 receiving the electronic device 12. In one aspect, the elastic body 14 may be formed of a high tensile strength silicone material. The high tensile strength silicone retains its elastic property and applies a biasing force to a water sealing rib 24 to maintain a seal with the electronic device 12 as will be discussed in more detail below.

The side wall 18 includes separated inner and outer surfaces 26, 28. The inner surface 26 includes a plurality of separated sealing ribs 30 formed thereon. The plurality of sealing ribs 30 is formed circumferentially about the side wall 18 and extends radially inward toward the electronic device 12. One of the plurality of ribs 30 is a water sealing rib 24 and includes a radial dimension that is greater than in comparison to the other sealing ribs 32 of the plurality of sealing ribs 30. In one aspect, the water sealing rib 24 includes a radial dimension that is at least twice the size in comparison to the other sealing ribs 32 of the plurality of sealing ribs 30.

The side wall 18 includes a fold partition 34 formed therein. The fold partition 34 includes a trough 36 formed therein that extends from the inner surface 26 toward the outer surface 28. The trough 36 defines a fold line 38 which allows the sleeve 10 to be moved between open and closed positions as will be discussed in more detail below.

In the depicted embodiments, the plurality of sealing ribs 30 are formed proximate the open top 16. In one aspect, the water sealing rib 24 is positioned closer to the open top 16 relative to the other of the plurality of ribs 30. The other of the plurality of ribs 30 may act as dust ribs 32 as will be discussed in more detail below.

Figure 5:
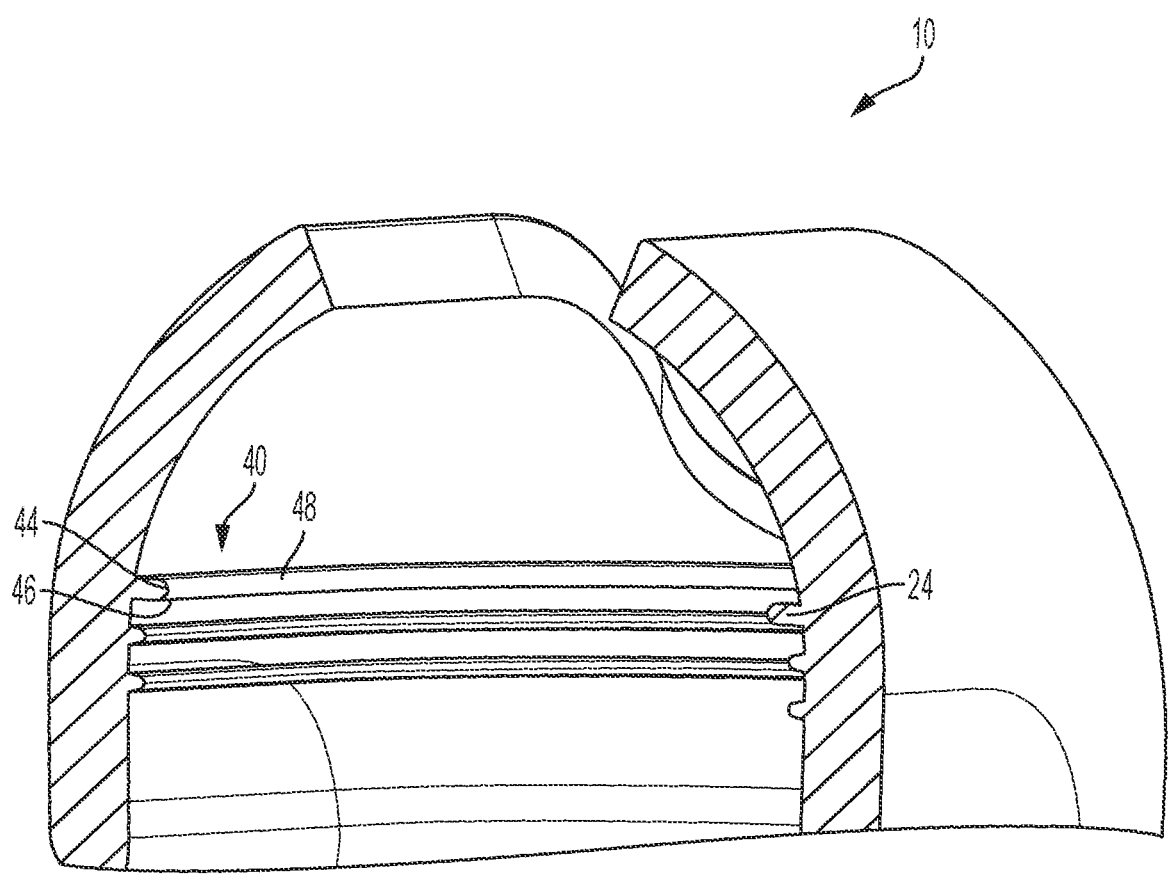
FIG. 5 is a partial perspective sectional view of the Sleeve showing the water sealing rib.

Referring to FIG. 5, the water sealing rib 24 includes a compound curve 40. The compounds curve 40 seals to a curved surface 42 of the electronic device 12.

The compound curve 40 includes a first radius and a second radius 44, 46. The first radius 44 is larger than the second radius 46 and seals to the curved surface 42 of the electronic device 12. The first and second radii 44, 46 converge to a tip portion 48 to prevent ingress of water.

In use, the electronic device 12 may be positioned through the open top 16 and then within the internal cavity 22 defined by the side wall 18 and bottom wall 20. The sleeve 10 may be moved between the open position shown in FIG. 1 (labeled as position 3) where a user may have access to the electronic device 12 and the closed position shown in FIG. 1 labeled as position 1. In the open position, the sleeve 10 is folded about the fold line 38 to allow access to the electronic device 12.

In the closed position, the water sealing rib 24 flexes due to an elastic force applied by the silicone material of the sleeve 10. The flexed water sealing rib 24 includes the compound curve 40 which contacts the curved surface 42 of the electronic device 12 providing a robust water proof seal.

The single water sealing rib 24 having a radial dimension at least twice that of the other ribs 32 provides an improved seal in comparison to a plurality of sealing ribs having the same radial dimension. The single water sealing rib 24 results in a focusing of the elastic force of the sleeve to a single rib as opposed to a distribution of the force over multiple ribs if all the sealing ribs were of the same size.

We claim:

1. A sealing device, comprising:
an elastic body including a side wall; and
a sealing rib formed on an internal surface of the side wall circumferentially about the side wall, the sealing rib comprising a first rib edge and an opposite second rib edge and having a compound curve whereby the first rib edge curves at a first radius and the second rib edge curves at a second radius, the first radius being larger than the second radius,
wherein the first rib edge and the second rib edge converge at a tip portion.

2. The sealing device of claim 1, further comprising at least one additional sealing rib formed on the internal surface of the side wall, wherein the sealing rib includes a radial dimension that is at least twice the size in comparison to the at least one additional sealing rib.

3. The sealing device of claim 2, wherein the elastic body further comprises an open top defined by the side wall and the sealing rib is formed proximate the open top.

4. The sealing device of claim 3, wherein the sealing rib is positioned closer to the open top relative to the at least one additional sealing rib.

5. The sealing device of claim 1, wherein the compound curve causes the sealing rib to seal to a curved surface of an electronic device surrounded by the elastic body.

6. The sealing device of claim 1, further comprising two dust ribs.

7. The sealing device of claim 1, wherein the elastic body further comprises an open top defined by the side wall and the first radius and the second radius are such that the sealing rib flexes toward the open top due to an elastic force applied by the elastic body on a curved surface of an electronic device surrounded by the elastic body when the sealing device is in a closed position.

8. The sealing device of claim 1, wherein the elastic body further comprises an open top defined by the side wall and the first rib edge of the sealing rib is positioned closer to the open top relative to the second rib edge of the sealing rib.

9. The sealing device of claim 1, wherein the internal surface of the side wall comprises a radius at an interface of the sealing rib with the internal surface of the side wall, and wherein the first rib edge and the second rib edge each extend inwardly toward the internal cavity from the interface.

10. A sealing device, comprising:
an elastic body including a side wall; and
a plurality of separated sealing ribs formed on an internal surface of the side wall, the plurality of sealing ribs formed circumferentially about the side wall;
wherein one of the plurality of sealing ribs is a water sealing rib and includes a radial dimension that is at least twice the size in comparison to the other sealing ribs of the plurality of sealing ribs, the water sealing rib comprising a first rib edge and a second rib edge, the first rib edge positioned closer to the open top relative to the second rib edge, the water sealing rib having a compound curve whereby the first rib edge curves at a first radius and the second rib edge curves at a second radius, the first radius being larger than the second radius.

11. The sealing device of claim 10, wherein the elastic body further comprises an open top defined by the side wall and the plurality of sealing ribs are formed proximate the open top.

12. The sealing device of claim 11, wherein the water sealing rib is positioned closer to the open top relative to the other of the plurality of sealing ribs.

13. The sealing device of claim 10, wherein the compound curve causes the water sealing rib to seal to a curved surface of an electronic device surrounded by the elastic body.

14. The sealing device of claim 10, wherein the plurality of sealing ribs includes the water sealing rib and two dust ribs.

15. The sealing device of claim 10, wherein the internal surface of the side wall comprises a radius at an interface of the water sealing rib with the internal surface of the side wall, and wherein the first rib edge and the second rib edge each extend inwardly toward the internal cavity from the interface.

16. A sealing device, comprising:
an elastic body including an open top and a curved side wall joined to a bottom wall, the curved side wall and bottom wall defining an internal cavity; and
a water sealing rib formed on an internal surface of the side wall, the water sealing rib formed circumferentially about the side wall;
wherein the water sealing rib comprises a first rib edge and a second rib edge that converge at a tip portion, the first rib edge positioned closer to the open top relative to the second rib edge, the water sealing rib having a compound curve whereby the first rib edge curves at a first radius and the second rib edge curves at a second radius, the first radius being larger than the second radius such that the water sealing rib flexes toward the open top due to an elastic force applied by the elastic body on a curved surface of an electronic device received within the internal cavity when the sealing device is in a closed position.

17. The sealing device of claim 16, wherein the water sealing rib is formed proximate the open top.

18. The sealing device of claim 16, further comprising at least one additional sealing rib formed on the internal surface of the side wall, wherein the water sealing rib is positioned closer to the open top relative to the at least one additional sealing rib.

19. The sealing device of claim 16, further comprising two dust ribs.

\* \* \* \* \*